J. O. Jones,
Horseshoe.
N° 9,173.  Patented Aug. 3, 1852.
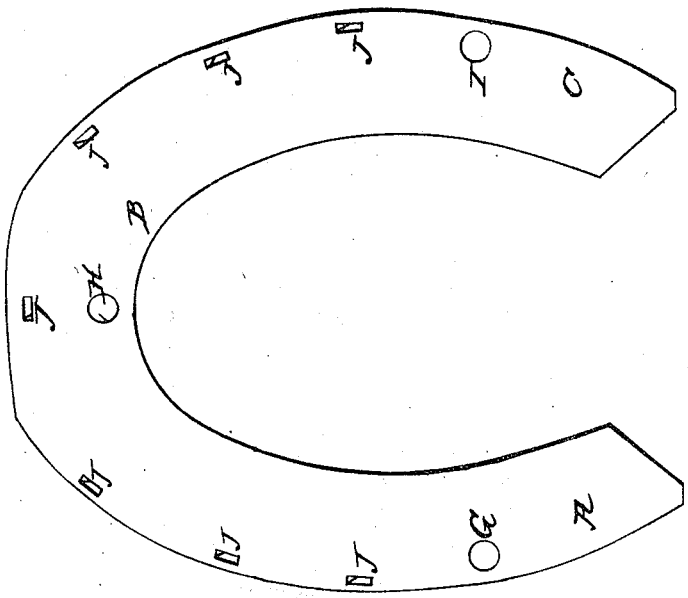
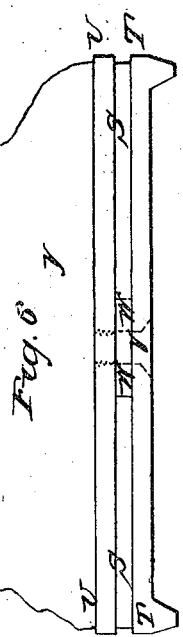
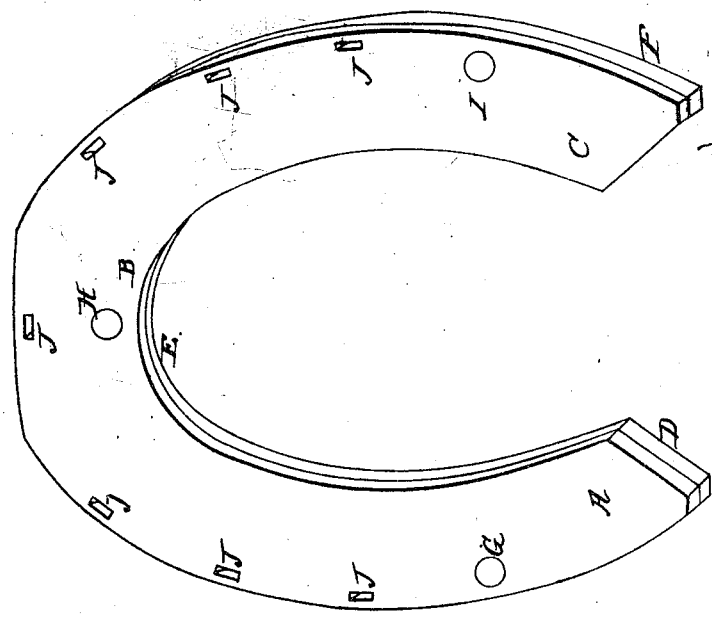

UNITED STATES PATENT OFFICE.

JOHN O. JONES, OF NEWTON, MASSACHUSETTS.

IMPROVED ELASTIC HORSESHOE.

Specification forming part of Letters Patent No. 9,173, dated August 3, 1852.

*To all whom it may concern:*

Be it known that I, JOHN O. JONES, of Newton, in the county of Middlesex and State of Massachusetts, have invented an Improvement in Horseshoes; and I do hereby declare that the following is a full, clear, and exact description of the construction and use of the same, reference being had to the annexed drawings, making a part of this specification, in which—

Figure II is a view of the upper surface of the top plate. Fig. VI is a side view of the double plates, showing the interposed sheet of india-rubber and the position of the washer.

It is well known that the hoofs of horses are liable to injury, and that many of the diseases of their feet are caused by the blows of the non-elastic iron shoe upon hard roads or stone pavements. My improvement is designed to prevent these injuries by the use of india-rubber or other elastic substance so combined with an iron shoe as to prevent the hoof of the horse from receiving so violent a blow as it does when the common iron shoe is used.

My improved elastic shoe consists of two plates, which may be made of malleable or of wrought iron, one plate being placed above the other and having a sheet of vulcanized india-rubber interposed.

Fig. II represents the upper surface of the top plate, which is placed in contact with the hoof of the horse and fastened to it by nails, which pass through the holes J J in the usual manner. Holes in this plate are tapped to receive the ends of screws which enter them after passing through corresponding holes in the bottom plate. I place a sheet of india-rubber, S, having the same outline as the shoe, between the two plates, as represented in Fig. VI. I secure the bottom plate, T, to the upper plate, U, by a screw, V, one or more screws being placed upon each side of the shoe and nearly under the middle of the hoof.

The head of this screw is countersunk in the bottom of the lower plate, T; thence the screw passes upward through a washer, W, of suitable size and of about the same thickness as the sheet of rubber. Above this the screw enters the hole in the upper plate, tapped to receive it. As the foot of the horse strikes the ground, the lower plate moves slightly at the heel or at the toe, turning upon the washer W as a fulcrum. At the same time the sheet of india-rubber yields and its elasticity diminishes the force of the blow.

In the patent of Benjamin Rotch, granted in England May 11, 1816, an elastic substance was placed between the shoe and the hoof, and the shoe was divided in some cases into several parts, which were placed "end to end" around the hoof. This plan cannot be practically applied to advantage, for whenever the elastic substance is compressed the nails will either move in the shoe or in the hoof and become loose in a short time. By the use of the double plates herein described this is prevented, for the upper plate is held fast to the foot by nails applied in the usual manner, while the yielding parts are below this plate. When the elastic sheet is to be renewed, the lower plate only is taken off, a new sheet is inserted, and the lower plate secured to the upper one as before. Another advantage attending the use of my double plate consists in this: that shoes having diverse forms upon the lower surface may be applied in a few minutes, according to the state of the roads, or a winter shoe substituted for a summer shoe, thus preventing injury to the hoof by frequently drawing and driving the nails.

What I claim, and desire to secure by Letters Patent, is—

The shoe formed with two plates, between which a sheet of vulcanized rubber or other elastic substance is interposed in the manner and for the purpose herein set forth.

JOHN O. JONES. [L. S.]

In presence of—
SAML. BATCHELDER, Jr.,
JOHN M. BATCHELDER.